United States Patent [19]

Nakamura et al.

[11] 4,235,721
[45] Nov. 25, 1980

[54] REINFORCING PATCH PLATE APPLIED TO LIQUID PASSAGE HOLE IN FILTER-SURFACED EXPRESSING SHEET ON EXPRESSING FILTER PLATE

[75] Inventors: Masayuki Nakamura; Hisayoshi Yokoyama, both of Osaka, Japan

[73] Assignee: Kurita Machinery Manufacturing Company Limited, Japan

[21] Appl. No.: 16,152

[22] Filed: Feb. 28, 1979

[30] Foreign Application Priority Data

Mar. 16, 1978 [JP] Japan ................................. 53-30856
Mar. 20, 1978 [JP] Japan ................................. 53-31894

[51] Int. Cl.² ............................................. B01D 25/00
[52] U.S. Cl. ..................................... 210/227; 210/350
[58] Field of Search ............... 210/227, 228, 229, 230, 210/231, 348, 350; 100/198

[56] References Cited

U.S. PATENT DOCUMENTS 3,737,041  6/1973  Kitajma et al. .................. 210/228
3,957,645  5/1976  Kurita et al. .................... 210/231
3,988,242  10/1976  Kurita et al. .................... 210/227

Primary Examiner—Charles N. Hart
Assistant Examiner—E. Rollins Cross
Attorney, Agent, or Firm—Holman & Stern

[57] ABSTRACT

A reinforcing patch plate comprises a boss portion adapted to be fitted in a liquid passage hole, such as one for filtrate or wash liquor, which is open to a filter surface of a filter-surfaced expressing sheet, a liquid guiding flange portion integrally formed on one end of the boss portion to cover the portion of the expressing sheet around the liquid passage hole, and a core embedded therein to serve as an intermediate layer. The liquid guiding flange is provided on its face with liquid guiding outlet grooves which establish communication between the boss portion and the filtrate grooves of the filter surface of the expressing sheet. The liquid guide grooves are each defined between adjacent ridges arranged side by side on the flange portion and removably attached to the latter.

9 Claims, 17 Drawing Figures

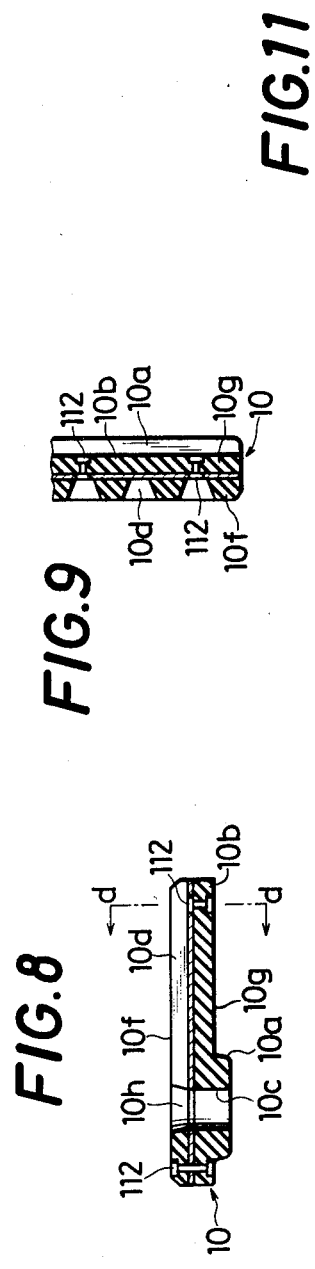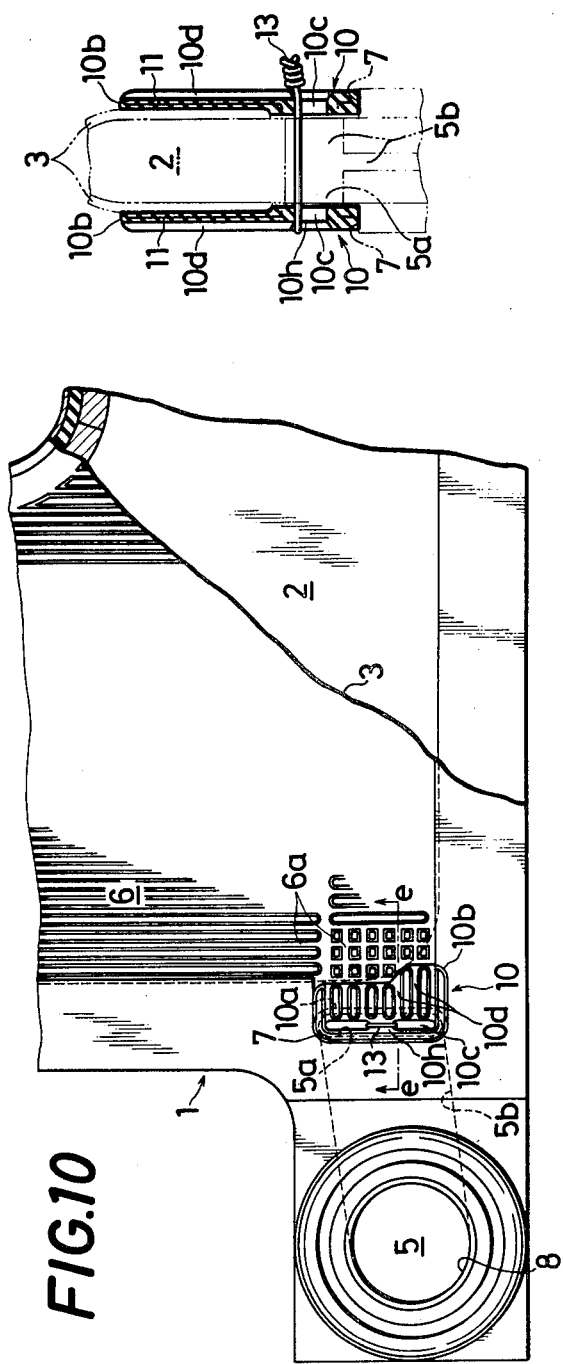

REINFORCING PATCH PLATE APPLIED TO LIQUID PASSAGE HOLE IN FILTER-SURFACED EXPRESSING SHEET ON EXPRESSING FILTER PLATE

BACKGROUND OF THE INVENTION

The present invention relates to a reinforcing patch plate applied to a liquid passage hole formed in a filter-surfaced expressing sheet of an expressing filter press so as to reinforce said liquid passage hole.

Such expressing sheet is made of a flexible fluid-tight material, such as rubber, and, as shown at A in FIG. 1, it is put on a base plate C to cover its opposite surfaces so as to provide an expressing filter plate E having an expressing fluid chamber I. As shown, such filter plates E are arranged alternately with ordinary filter plates G to define prefilt chambers H between adjacent plates. The surface of the expressing sheet A facing said prefilt chamber H is an irregular filter surface J clothed with a filter cloth F, so that when a prefilt is supplied to said prefilt chamber H, the filtrate passing through the filter cloth F will flow into filtrate outlet grooves K of said filter surface J. In order to guide to the outside of the filter press the filtrate flowing into the grooves K, the expressing sheet A is formed in a portion of its filter surface J with a filtrate or liquid passage hole B which communicates with a filtrate outlet passage D open to the margin of the base plate C and also with the filtrate outlet grooves K of the filter surface J. As known in the art, upon completion of the filtration, the expressing fluid chamber I is supplied with an expressing fluid to bulge the expressing sheet A toward the prefilt chamber H (see the left-hand side filter plate E in FIG. 1). Thereupon, the cake remaining in the prefilt chamber H as a result of the filtration is strongly pressed by said expressing sheet A to have its remaining liquid expressed therefrom. The pressing of cake is performed to increase the rate of removal of liquid as much as possible, and the urging of the expressing sheet against the cake is performed by an expressing fluid under high pressure. The expressing sheet A, therefore, over the filter surface area occupying the greater portion thereof, is urged against the cake with an expressing pressure of about 30 kg/cm² up to 100 kg/cm². In order to keep fluid-tight the expressing fluid chamber into which a sufficiently high pressure fluid to effect such expression is introduced, the expressing sheet A is clamped between the base plate C and the filter plate G with a pressure greater than said expressing pressure to overcome the high pressure of said expressing fluid and maintain the sheet in close contact with the base plate C.

Under these circumstances, the expressing sheet A is squeezed with a high pressure over its entire area from opposite sides, with the result that the sheet tends to decrease in thickness and to spread out in a plane, undergoing plastic deformation. This deformation is directed to the outer periphery of the expressing sheet A and to the liquid passage hole B where little or no resistance is encountered. The repetition of filtration and expression results in the liquid passage hole B being gradually constricted until it is blocked up. Such constriction or blockage of the liquid passage hole B hinders or prevents the outflow of filtrate. As a result, abnormal high pressure will build up in the filtrate chamber and expressing fluid chamber, entailing the danger of causing damage to such structures as the piping, control and filter plates E. This is also the case with the wash liquor communication passage system for back washing which allows wash liquor to flow from another liquid passage hole for wash liquor (not shown) formed in the expressing sheet to pass through the filter cloth F in a direction reverse to that of the flow of filtrate, namely from the filter surface J of the sheet A toward the prefilt chamber H. In that case, however, since the pressure involved is low, the possible damage would not be so serious.

In an effort to solve the problems described above, there has already been provided a liquid passage hole reinforcing patch plate N, as shown in FIG. 1, which comprises a boss portion M adapted to be fitted in the liquid passage hole B and a liquid guiding flange L disposed at one end of said boss portion to cover the portion of the expressing sheet A around the liquid passage hole B therein (see U.S. Pat. No. 3,988,242). This reinforcing patch plate N is made of a material, such as rubber, which has a hardness equal to or greater than that of the expressing sheet A, and it protects the liquid passage hole B from constriction or blockage due to plastic deformation of the expressing sheet A. However, the reinforcing patch plate N itself is also subjected to said pressure of about 30 kg/cm² up to 100 kg/cm², with the result that the boss portion M and flange portion L wholly or locally undergo various types of deformation including warp and twist, prematurely losing the function of protecting the liquid passage hole B and the portion of the expressing sheet A therearound. The flange portion L is formed with a plurality of liquid guide grooves O enabling the boss portion M to communicate with the filtrate outlet grooves K formed on the filter surface J of the expressing sheet A. Such grooves O will also be damaged as said various types of deformation take place, thereby hindering the flow of filtrate. Consequently, such reinforcing patch plate N needs frequent replacing, which is troublesome and economically disadvantageous.

The use of metal to make the reinforcing patch plate N would be effective to solve the problem so far as durability is concerned. However, since metal does not agree with the pliability of the expressing sheet A, it locally prevents the expansion and contraction of the expressing sheet A and the related elastic action of the whole, thus giving much fatigue to the boundary between the portion of the expressing sheet A protected by the patch plate N and the unprotected portion therearound. Accordingly, the life of the expressing sheet A itself is greately decreased.

SUMMARY OF THE INVENTION

A first object of the invention is to provide an improved liquid passage hole reinforcing patch plate which is durable and which is capable of satisfactorily protecting the liquid passage hole without adversely affecting the expressing sheet.

A second object of the invention is to maintain the liquid guiding function of said improved patch plate to provide for long-term use by making interchangeable the weaker portions of said patch plate, namely the ridges which define the liquid guide grooves on the surface of the liquid guiding flange thereof.

A first feature of the invention is that a core made of metal, rigid plastic, fiberglass reinforced plastic (FRP) or other material which has a higher hardness than that of the patch plate is provided in the boss portion and flange portion of the patch plate. The core is provided as an intermediate layer in the boss portion and flange portion of the patch plate by insert-molding or gluing the patch plate. The patch plate thus improved according to the invention is itself stout and highly resistant to deformation, exhibiting superior durability under the high pressure conditions described above to satisfactorily protect the liquid passage hole and the portion of the expressing sheet therearound, thereby assuring the function and safety of the expressing filter press. While the patch plate is reinforced by the hard core, its surface layer portion which contacts the expressing sheet and filter cloth is of the material forming the patch plate proper, namely urethane rubber, plastic or the like whose hardness is equal to or greater than that of the expressing sheet. Thus, since it is softer than said core, it allows the expansion and contraction and related elastic deformation of the expressing sheet to a certain extent to avoid an extreme difference in elastic deformation between the portion of the expressing sheet protected by the patch plate and the unprotected portion thereof around the patch plate, preventing the expressing sheet from being fatigued or damaged without shortening the useful life thereof.

A second feature of the invention is that the ridges defining the liquid guiding grooves on the surface of the liquid guiding flange portion of the patch plate are removably installed. The ridges have their base portions dovetail-shaped and adapted to fit into mating dovetail grooves on the surface of the liquid guiding flange or they are attached to said surface with screws, so that they can be replaced by new ridges depending upon the degree of their fatigue or deformation. Therefore, the patch plate reinforced by said core has no possibility of having the liquid guiding grooves collapsed and becoming unusable, and its service life can be prolonged by the amount corresponding to its improvements in durability.

Other features of the invention will become more apparent from the following description of embodiments given with reference to the accompanying drawings.

BRIEF DESCRIPTION OF THE DRAWINGS

FIG. 8 is a fragmentary section showing another modification;

FIG. 9 is a fragmentary section taken along the line d—d of FIG. 8;

FIG. 10 is a fragmentary front view of an expressing filter plate, showing how it is installed;

FIG. 11 is an enlarged section taken along the line e—e of FIG. 10;

DESCRIPTION OF THE PREFERRED EMBODIMENTS

Figure 1:
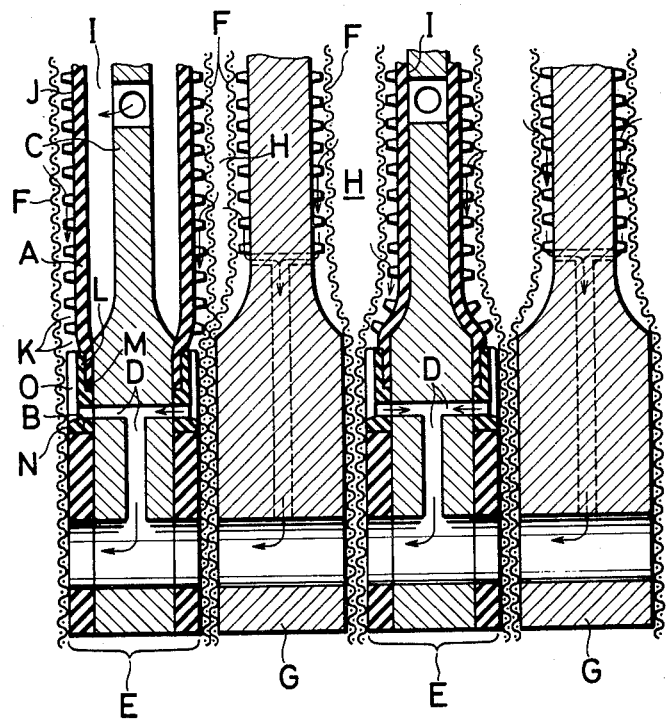
FIG. 1 is a longitudinal section, partly broken away, of the expressing filter plates of a filter press of the expression type having conventional liquid passage hole reinforcing patch plates mounted thereon.
Figure 2:
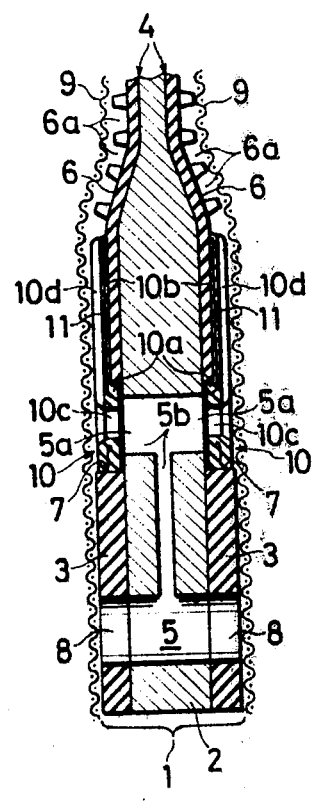
FIG. 2 is a section of an expressing filter plate having reinforcing patch plates according to an embodiment of the invention mounted thereon.
Figure 3:
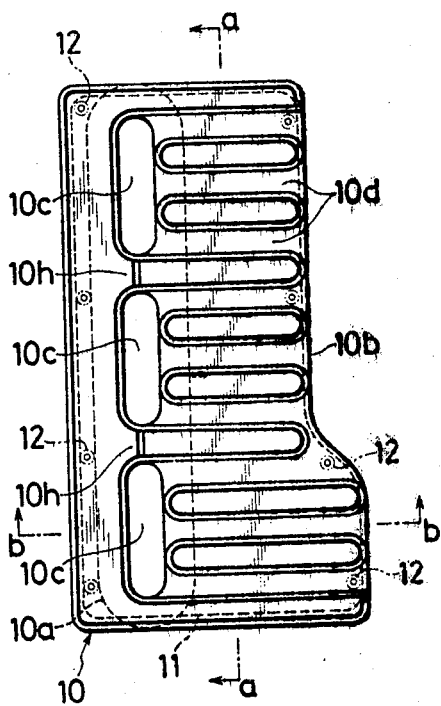
FIG. 3 is an enlarged front view of the patch plate of FIG. 2.
Figure 4:
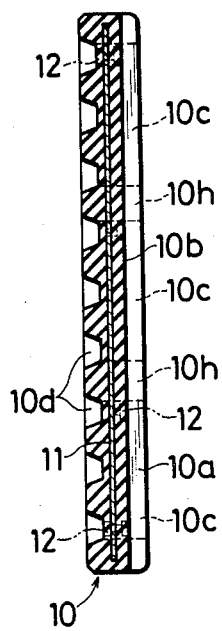
FIG. 4 is a section taken along the line a—a of FIG. 3.
Figure 5:
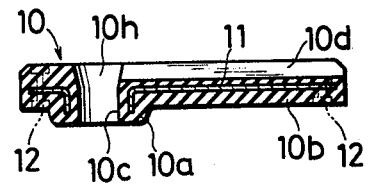
FIG. 5 is a section taken along the line b—b of FIG. 3.
Figure 6:
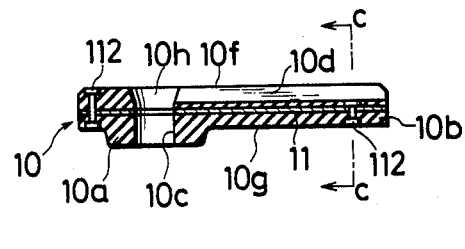
FIG. 6 is a section showing a modified form of patch plate.
Figure 7:
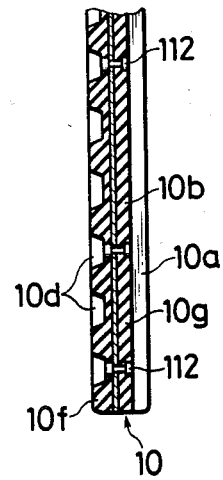
FIG. 7 is a fragmentary section taken along the line c—c of FIG. 6.
Figure 12:
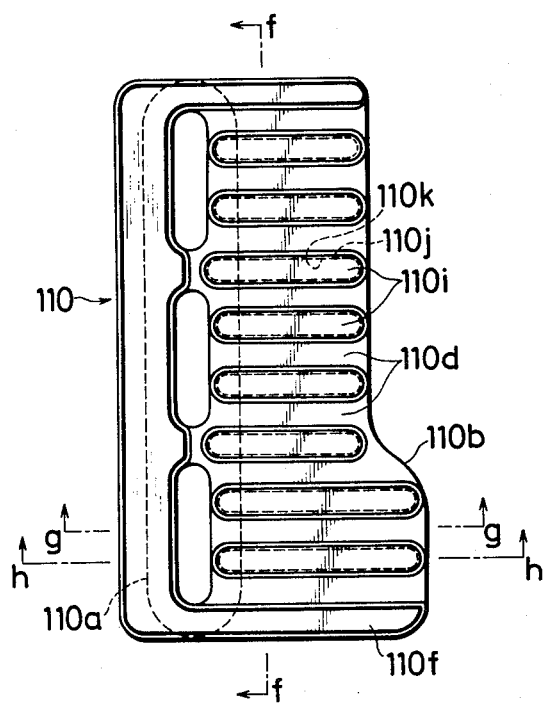
FIG. 12 is a front view of a patch plate, showing a further embodiment of the invention.
Figure 13:
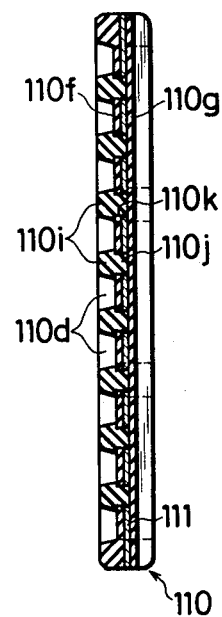
FIG. 13 is a section taken along the line f—f of FIG. 12.
Figure 14:
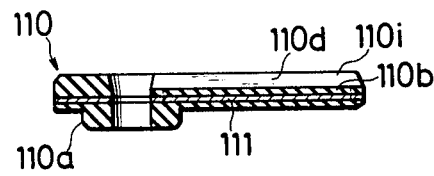
FIG. 14 is a section taken along the line g—g of FIG. 12.

The embodiment of the invention shown in FIGS. 2 through 5 will now be described. An expressing filter plate 1 comprises a base plate 2 forming the core of the filter plate, and an expressing sheet 3 of flexible fluid-tight material, such as rubber, which covers the opposite surfaces of said base plate 2, with an expressing fluid chamber 4 defined between the base plate 2 and the expressing sheet 3. The lower end portion of the base plate, on one side thereof, is provided with a filtrate outlet passage 5 which is open to the margins of the opposite surfaces to establish communication between adjacent filter plates, and a second filtrate outlet passage 5b which is open, as at 5a, to the margins of the opposite surfaces. The sheet 3 is provided in its marginal portion with liquid passage holes 7 which communicate with said openings 5a and which are open to the filter surface of the sheet, and communication holes 8 communicating with the main filtrate outlet passage 5.

Patch plates 10 for reinforcing the liquid passage holes 7 of the sheet 3 are made of a material whose hardness is equal to or somewhat greater than that of the sheet 10. Each patch plate comprises a boss portion 10a adapted to be fitted into the liquid passage hole 7 of the sheet 3 to cover the portion of the sheet around the liquid passage hole 7, and a liquid guiding flange portion 10b extending from one end of said boss portion to the filter surface 6 of the sheet 3. The flange portion 10b is formed on its surface with a plurality of liquid guiding grooves 10d which establish communication between the filtrate guiding grooves 6a on the filter surface 6 and a hole 10c in the boss portion 10a, whereby the filtrate flowing out of the prefilt chamber defined between adjacent filter plates onto the filter surface 6 is guided to said hole 10c. The patch plate 10 is provided with a core 11 serving as a reinforcing intermediate layer. The core 11 is made of metal, rigid plastic, fiberglass reinforced plastic (FRP) or the like and is embedded by insert-molding the boss portion 10a and flange portion 10b of urethane rubber or other rubber or soft plastic. In order to make more firm the bond between the patch plate 10 and the core 11, they may be joined together by pins 12 or screws, as shown in phantom lines. Further, as shown in FIGS. 6 and 7 or FIGS. 8 and 9, the patch plate may be made in two parts, a front portion 10f and a back portion 10g, with the core 11 interposed therebetween and fixed in position by pins 112 or screws. The use of screws would be convenient for removal or repair of the parts.

Each of the various patch plates 10 disclosed in the embodiments described above is formed with bridges 10h each lying between adjacent holes 10c of the boss portion 10a. The two patch plates 10 opposed to each other with the base plate 2 interposed therebetween are fixed in position by being tied together with a wire 13 or the like passed around the opposed bridges 10h of the patch plates, as shown in FIGS. 10 and 11. However, the patch plates 10 may be adhesively bonded to the sheet 3 or they may be attached by screwing the flange portions 10b to the sheet 3. Thus, the method of attachment is optional.

In addition, the patch plate 10 may be formed by welding process wherein plate components are put together with the core interposed therebetween are joined together under pressure and heat. In this case, as well as in the above-mentioned insert molding, the core 11 is provided with holes at suitable places so that the front and back plate components of rubber or the like will be united at said places through said holes. Therefore, the core 11 can be firmly joined without the need of using pins 112 or the like.

With each of the various patch plates 10 described above, even if the sheet 3 undergoes said plastic deformation, the boss portion 10a fitted in the liquid passage hole 7 of the sheet will prevent the sheet from spreading to the liquid passage hole 7 and retain the intial degree of opening of the liquid passage hole 7, thereby assuring smooth outflow of filtrate to enable filtration to be carried out satisfactorily and with safety. Accordingly, the present filter plate, unlike conventional ones, will cause no disadvantage of lowering the efficiency of filtration or producing abnormal high pressure.

The patch plate 10 has its boss portion 10a and flange portion 10b reinforced by the core 11 and will not warp or twist wholly or locally, so that it will exhibit for a long time the function of protecting the liquid passage hole 7 and the filtrate guiding function provided by the grooved flange portion 10b and boss portion 10a, improving the operability of the expressing filter press and stabilizing the filtrating and expressing functions thereof. Further, since the back portion of the patch plate 10 whose hardness is approximately equal to or somewhat greater than that of the expressing sheet 3 contacts the sheet with softness greater than that of the core 11, there is no danger of fatiguing or damaging the sheet 3 and filter cloth 9 or shortening their life.

Figure 16:
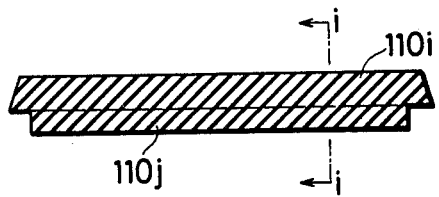
FIG. 16 is an enlarged longitudinal section of a ridge.
Figure 15:
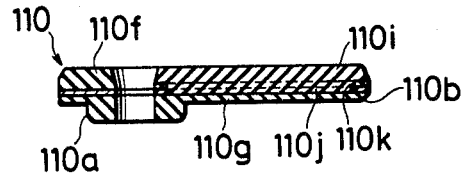
FIG. 15 is a section taken along the line h—h of FIG. 12.
Figure 17:
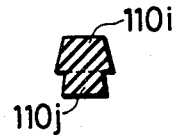
FIG. 17 is a section taken along the line i—i of FIG. 16.

In an embodiment shown in FIGS. 12 through 17, as in the above embodiments, a patch plate 110 has a core 111. In this embodiment, however, liquid guiding grooves 110d on the surface of the liquid guiding flange portion 110b are defined by ridges 110i removably arranged side by side on the surface of the flange portion 110b. The ridges 110i are made of the same material as the boss portion 110a and flange portion 110b, e.g., rubber, or as the core 111, e.g., metal, rigid plastic or fiberglass reinforced plastic (FRP). As shown in FIGS. 16 and 17, they each have a dovetail portion 110j in their base portions. The patch plate 110 comprises a front portion 110f and a back portion 110g which, together with the core interposed therebetween, are united by an adhesive agent, pins or screws, and dovetail grooves 110k which open to the surface of the flange portion 110b are formed to extend through the front portion 110f and core 111. By fitting the dovetail portions 110j into the dovetail grooves 110k, the ridges 110i are attached to the flange portion 110b.

If the ridges 110i are made of metal or other hard material, the boss portion 110a, flange portion 110b and liquid guiding grooves 110d are reinforced also by such ridges, making the entire assembly stronger and improving its durability. The function of protecting the liquid passage hole and the filtrate guiding function of the liquid guiding grooves 110d and boss portion 110a will remain stabilized for a long time. Further, even if the ridges 110i are made of the same material as the boss portion 110a and flange portion 110b, they may be replaced by new ridges when damaged, so that there is no possibility of the life of the patch plate being shortened by the ridges 110i.

Since the ridges 110i have their dovetail portion 110j fitted in the dovetail grooves down to the core 111, the mounting strength is sufficiently high to prevent them from coming off.

What is claimed is:

1. In a liquid passage reinforcing patch plate for use with an expressing sheet of flexible fluid-tight material, such as rubber, which separates the prefilt chamber and the expressing fluid chamber from each other and which is formed with an irregular filter surface opposed to the prefilt chamber and is adapted to bulge toward the prefilt chamber upon completion of filtration so as to press the cake, said patch plate being mounted in a liquid passage hole, such as a filtrate outlet hole or wash liquor introducing hole, which is open to said filter surface, said patch plate having a boss portion adapted to be fitted in said liquid passage hole and a liquid guiding flange portion integrally formed at one end of said boss portion to cover the portion of the expressing sheet around said liquid passage hole in the sheet, said boss and flange portions being made of a material whose hardness is equal to or somewhat greater than the expressing sheet, said liquid guiding flange portion being formed on its surface with liquid buiding grooves establishing communication between the liquid guiding grooves of the expressing sheet surface and said boss portion, the improvement comprising said boss and flange portions being of laminated construction wherein a core serving as a reinforcing intermediate layer is interposed between a front layer and a back layer which are integrated with the core.

2. A liquid passage reinforcing patch plate as set forth in claim 1, wherein the boss and flange portions of said patch plate are made of urethane rubber or other rubber or plastic.

3. A liquid passage reinforcing patch plate as set forth in claim 1, wherein said core is made of metal, rigid plastic or fiberglass reinforced plastic.

4. A liquid passage reinforcing patch plate as set forth in claim 1, wherein said core is embedded in the patch plate by means of the insert-molding of the boss and flange portions of the patch plate.

5. A liquid passage hole reinforcing patch plate as set forth in claim 1, wherein said core is joined to the front and back layers of the patch plate by mechanical fastening means, such as rivets and screws.

6. A liquid passage hole reinforcing patch plate as set forth in claim 1, wherein said core is joined to the front and back layers of the patch plate by means of bonding or welding.

7. A liquid passage hole reinforcing patch plate as set forth in claim 6, wherein mechanical fastening means, such as rivets, is jointly used in said joining of the core to the front and back layers of the patch plate.

8. A liquid passage hole reinforcing patch plate as set forth in claim 1, wherein the core has holes at a suitable number of places and is welded to the front and back layers of the patch plate.

9. A liquid passage hole reinforcing patch plate as set forth in claim 1 wherein the liquid guiding grooves of the liquid guiding flange portion are each defined between adjacent ridges arranged side by side on the surface of the flange portion, said ridges being removably attached to the flange portion by having dovetail base portions interengaging in dovetail grooves formed in the surface of the flange portion and extending through said core.

* * * * *